Figure 1:
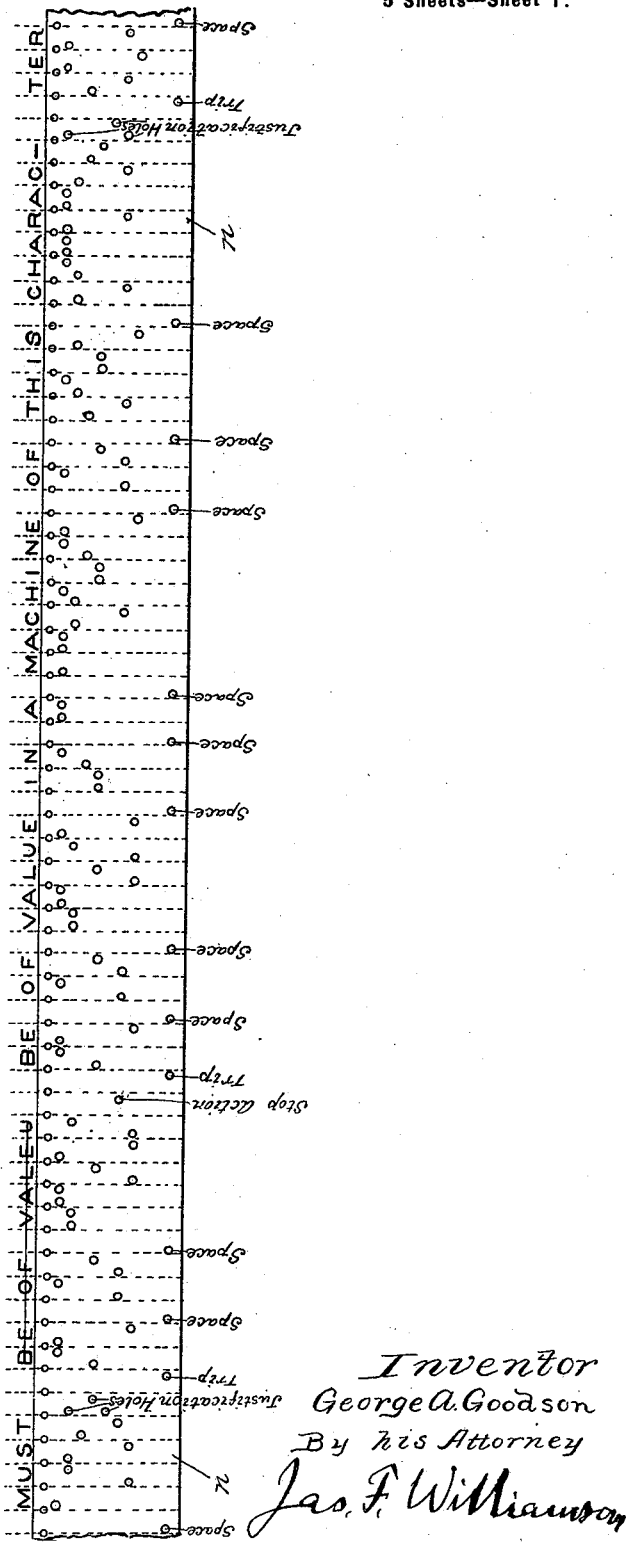

No. 648,201. Patented Apr. 24, 1900.
G. A. GOODSON.
AUTOMATIC MACHINE FOR PRODUCING PRINT OR PRINTING SURFACES.
(Application filed Sept. 27, 1899.)
(No Model.) 5 Sheets—Sheet 2.

Witnesses
C. F. Kilgore
Harry Kilgore

Inventor
George A. Goodson
By his Attorney
Jas. F. Williams

No. 648,201. Patented Apr. 24, 1900.
G. A. GOODSON.
AUTOMATIC MACHINE FOR PRODUCING PRINT OR PRINTING SURFACES.
(Application filed Sept. 27, 1899.)
(No Model.) 5 Sheets—Sheet 3.
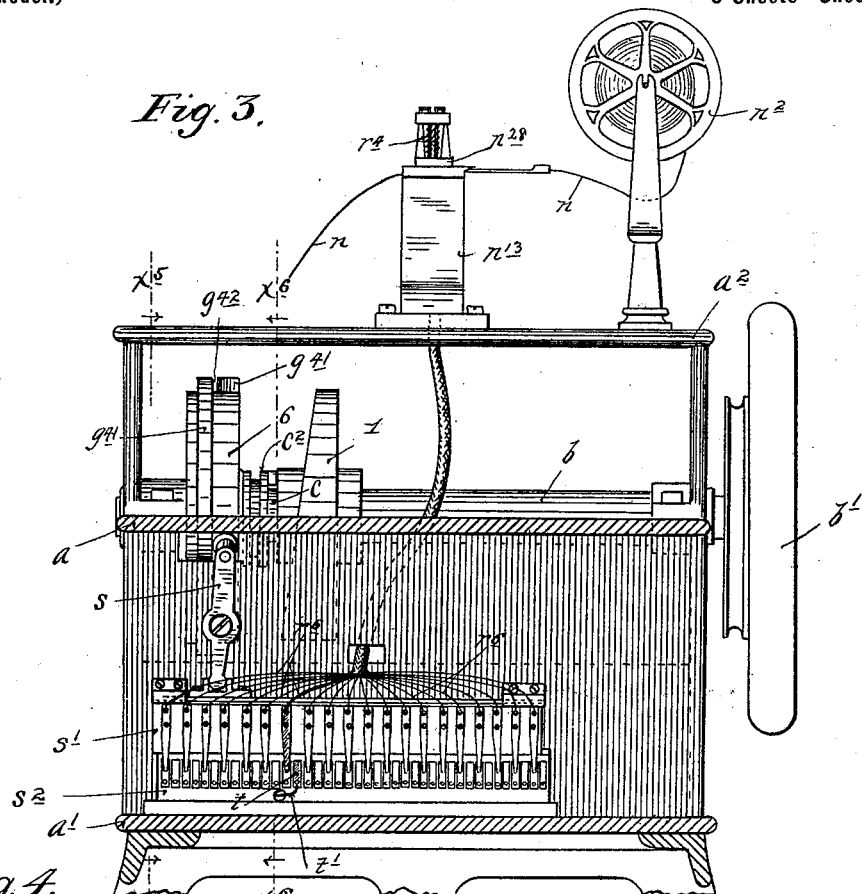
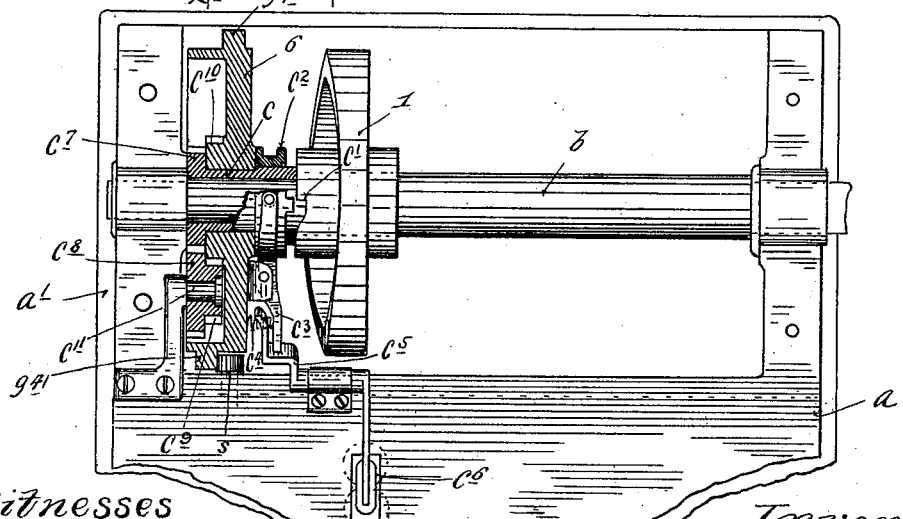
Witnesses
C. F. Kilgore
Harry Kilgore
Inventor
George A. Goodson
By his Attorney
Jas. F. Williamson

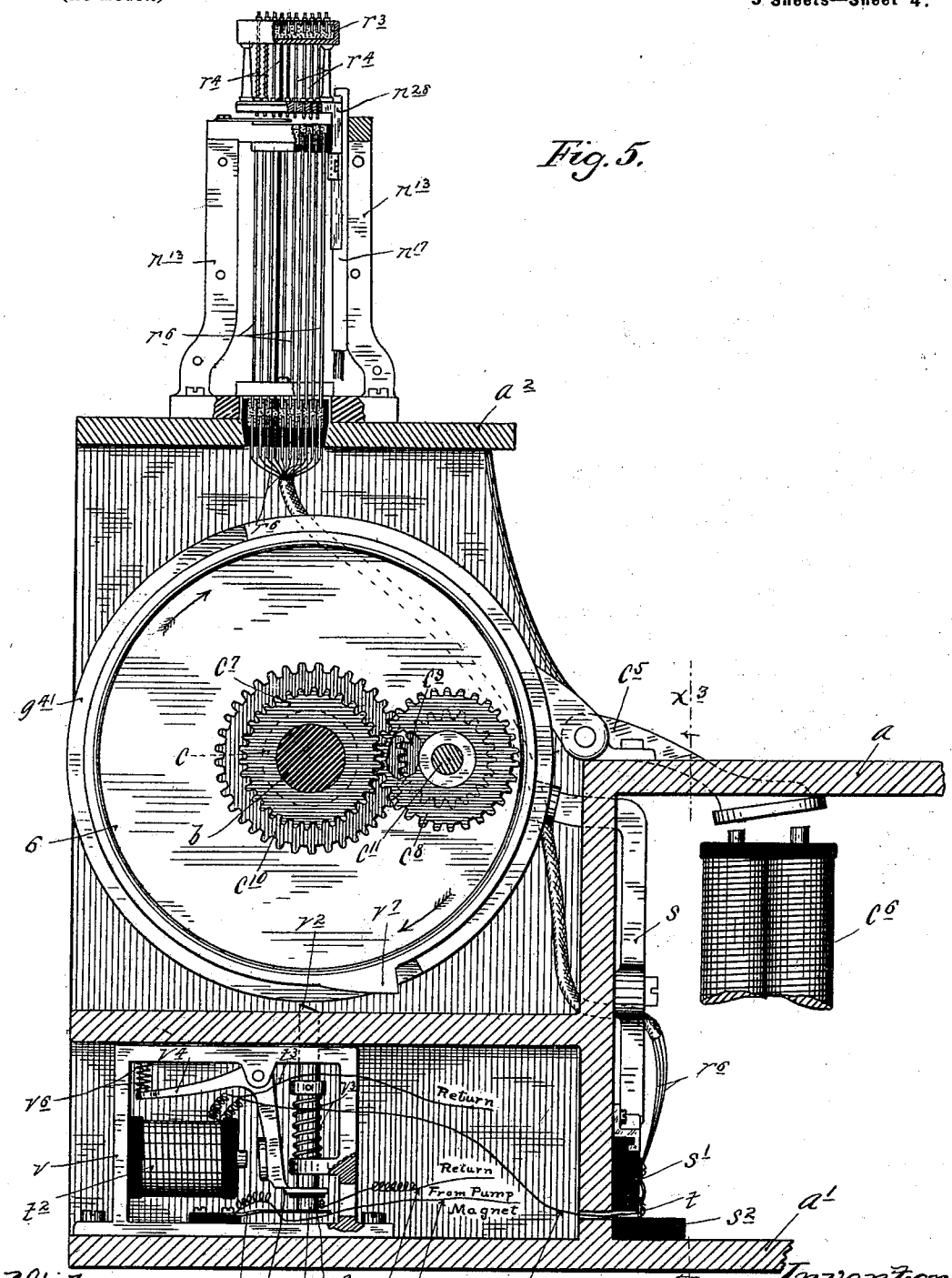

No. 648,201. Patented Apr. 24, 1900.
G. A. GOODSON.
AUTOMATIC MACHINE FOR PRODUCING PRINT OR PRINTING SURFACES.
(Application filed Sept. 27, 1899.)
(No Model.) 5 Sheets—Sheet 5.

Witnesses
C. F. Kilgore
Harry Kilgore

Inventor
George A. Goodson
By his Attorney
Jas. F. Williamson

UNITED STATES PATENT OFFICE.

GEORGE A. GOODSON, OF MINNEAPOLIS, MINNESOTA.

AUTOMATIC MACHINE FOR PRODUCING PRINT OR PRINTING-SURFACES.

SPECIFICATION forming part of Letters Patent No. 648,201, dated April 24, 1900.

Application filed September 27, 1899. Serial No. 731,787. (No model.)

*To all whom it may concern:*

Be it known that I, GEORGE A. GOODSON, a citizen of the Dominion of Canada, residing at Minneapolis, in the county of Hennepin and State of Minnesota, have invented certain new and useful Improvements in Automatic Machines for the Production of Print or Printing-Surfaces; and I do hereby declare the following to be a full, clear, and exact description of the invention, such as will enable others skilled in the art to which it appertains to make and use the same.

My invention was especially designed to effect a certain improvement in what is known to the trade as the "Goodson System for Casting and Setting Type." The invention is, however, in the broad point of view capable of general application to automatic machines which are controlled by a previously-prepared pattern or dummy to produce a product represented on said pattern or dummy. For example, it is capable of general application to machines for the production of print or printing-surfaces when those machines are automatic in their actions and operate under the control of a previously-prepared pattern or dummy representing the desired line of composition.

The Goodson system is disclosed in United States patents issued to me of date December 4, 1894, June 21, 1898, and August 16, 1898. United States Patent No. 606,007, of date June 21, 1898, discloses my composing-machine in substantially its commercial form, and United States Patent No. 609,098, of date August 16, 1898, discloses my type casting and setting machine in substantially its commercial form. For the purposes of the present application it will be sufficient to refer to the said two prior patents, Nos. 606,007 and 609,098. In this Goodson system the type casting and setting machine is entirely automatic in its action and operates under the control of the pattern or punctured representative strip to produce justified lines of individual type. The parts which coöperate for setting the justifier for any given line and the parts which coöperate in the casting and setting action to produce and set the type of any given line are directly controlled by electric devices. The electric devices are in turn provided with circuit connections, which are controlled by the said punctured representative strip or pattern. Said representative strip is prepared on the composing-machine. Said composing-machine includes an ordinary standard type-writing machine, a unit-register or differential-feed letter-space indicator electrically connected with the type-writer, a justifier constructed to represent the desired action for distribution of any number of units of excess or shortage among any number of word spaces or quads within the predetermined limits, and a perforator. The perforator is electrically connected with the type-writer and with the justifier for puncturing the strip to represent all the actions required on the type casting and setting machine for producing type representing the composition in justified lines. At the same time the type-writing machine turns out an ordinary type-written proof of the composition. This type-written proof being present before the eyes of the operator it, is possible to detect typographical errors, such as transposition of letters, misspelling, &c. If the operator also be the composer or be working from dictation, it may be deemed desirable to eliminate or change some word or expression in the composition. With my machines, as disclosed in my prior patents, such corrections or changes could not be made on a continuous strip. The strip could be separated at the last preceding line as a "take," and then the corrected or substituted matter could be represented as part of a new take on the strip. In this way only errors could be corrected or changes could be made on the strip; but the type casting and setting machine as disclosed in my prior patents reproduced in type the composition exactly as represented on the strip, whether containing undesired matter or not. It was the custom when using the machine as disclosed in my prior patents to make the minor corrections, such as typographical errors, by the substitution of type in the set line on the galley or form after the type-proof was taken. Only the major corrections or changes, such as the substitution of new words or the elimination of words, were attempted at the composing-machine by the separation of the strip and the use of new takes. By my present invention, however, I provide means whereby the type casting and setting machine will not produce type corresponding to composition containing errors or other undesired matter, as represented by the continuous strip, provided these faults be detected and the necessary stop action be represented on the strip before it leaves the composing-machine. Otherwise stated, I provide means whereby the type casting and setting machine will run idle, so far as the casting actions are concerned, during the feed movements or travel of that portion of the strip which contains the representation of the undesired matter. Hence whenever the operator at the type-writer detects an error or desires to substitute, eliminate, or add a new word or expression to the composition he simply stops the given line or fraction of a line of composition and then next strikes a special key for making a hole to represent the stop action on the strip in the feed-space which would otherwise have been occupied by the justification-holes. He then strikes the clutch-trip key in the same way as in my prior patents to produce the trip-hole for the clutch in the last feed-space in exactly the same way as at the end of a complete or correct line. He then proceeds with his corrected composition as part of a new line to be represented on the continuous strip. The strip is of course fed to the type casting and setting machine in the reverse order of its making at the composing-machine, as disclosed in my prior patent. Hence when the line or fraction of a line containing the undesired matter is reached on the strip the clutch-trip hole comes first into play, as heretofore, for throwing the normally-idle cam into action, and then at the next feed-step of the trip said special or stop action hole comes next into play during the same feed movement or time which would otherwise have been appropriated to the justification-holes and controls the setting of the stop-action device. When this stop-action device is once set, it renders the casting devices inoperative until the next correct line is reached on the strip. It has already been stated that all the devices which coöperate in the casting action are directly controlled by electric devices. By this statement was meant all the devices which required to be variably set—such, for example, as the stops for intercepting the two-way movable matrix-block and the mold-plunger for the proper coöperation to produce in succession the selected type for the line, and the stops which variably intercept the parts of the justifier, requiring to be set before a line is begun in order that quads of proper sizes may be made to justify the line. The statement was also intended to include the electric trip for the pump which forces the molten metal from the melting-pot into the mold when the matrix-block and the mold-plunger have been properly positioned for a given cast. The pump is provided with a lock which normally holds the pump-plunger in its uppermost and idle position under tension from its operating-spring until the lock is tripped by the energizing of the pump-trip magnet. Hence no cast can be made until that pump-lock is tripped. Now all of the said electric devices which directly control the casting actions, including the magnets which position the matrix-block, the magnets which position the mold-plunger, and the escapement-magnet at the justifier, which operates at every word-space hole on the strip, are in branches of the so-called "working circuit," and the said working-circuit connections are so arranged that they all have a common return-wire extending through the pump-trip magnet just hereinbefore noted. Hence if the circuit be opened in this return branch at some point between the pump-trip magnet and the source it is obvious that no cast can be made. The stop-action device for the Goodson machine may therefore and does, as a matter of fact, take the form of a circuit-breaker located in said common return branch of the working circuit at some point intermediate the pump-trip magnet and the source. Said circuit-breaker is then arranged to be tripped into its open position under the control of the stop-action hole on the strip through branch connections added to the setting-circuit, and when the said circuit-breaker is so open it will remain so set in its open position until the next correct line is reached on the strip.

From the foregoing statements it will be seen that my present improvement is in point of principle extremely simple and easy to understand. The parts of said stop-action device or circuit-breaker are also few in number and capable of brief description. In order, however, to exactly locate said circuit-breaker in its relations to the other parts of the system, it is necessary to refer to some of the old parts of the machine in detail and to others in a general way. This will now be done with reference to the accompanying drawings.

In the said drawings the old parts, so far as shown, are assumed to be exactly as disclosed in my said prior patent, No. 609,098, of date August 16, 1898, and such thereof as it is necessary to specify are marked with the same notations as in said prior patent.

In the said drawings like notations refer to like parts throughout the several views.

Figure 2:
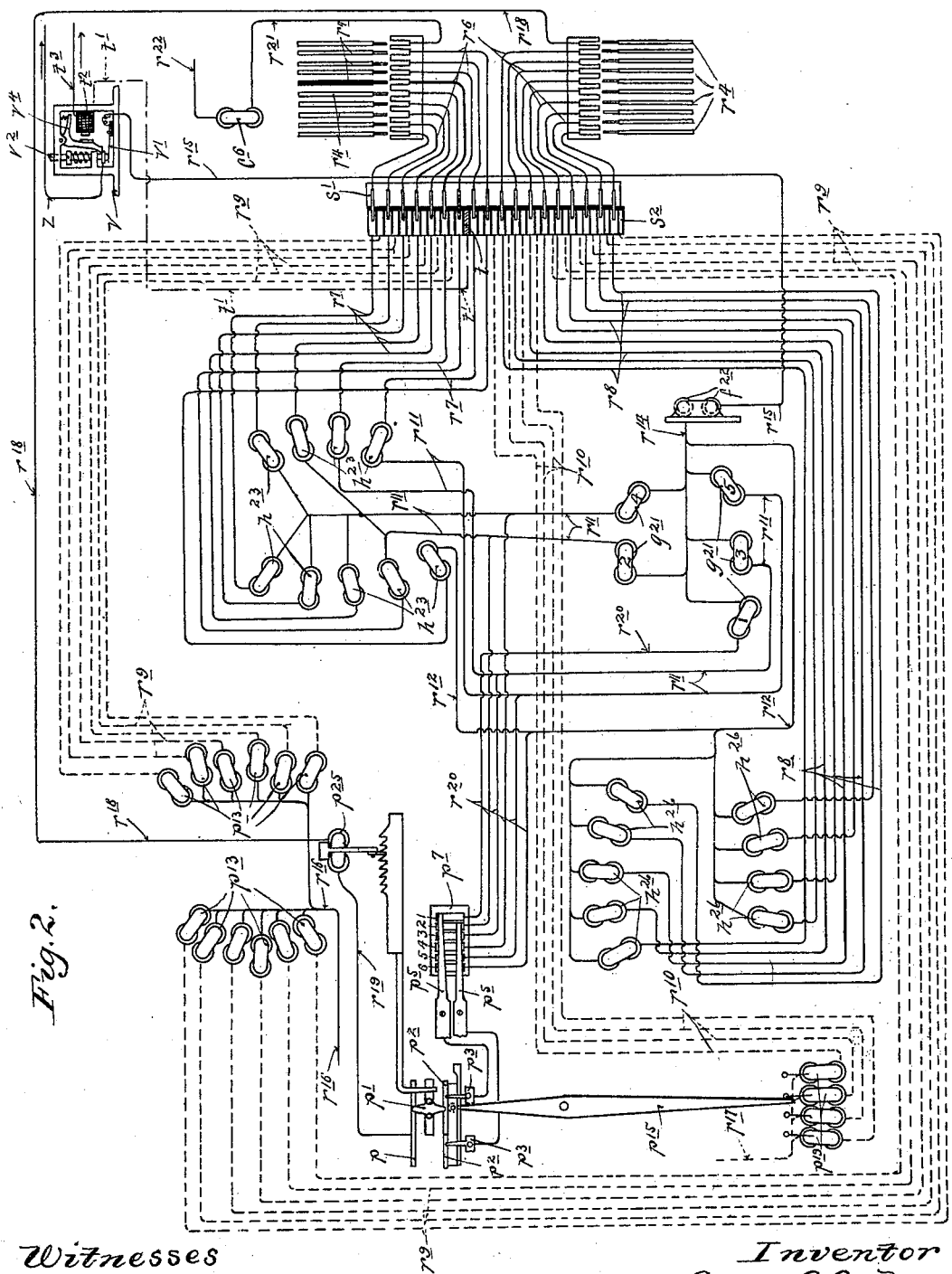
Figure 6:
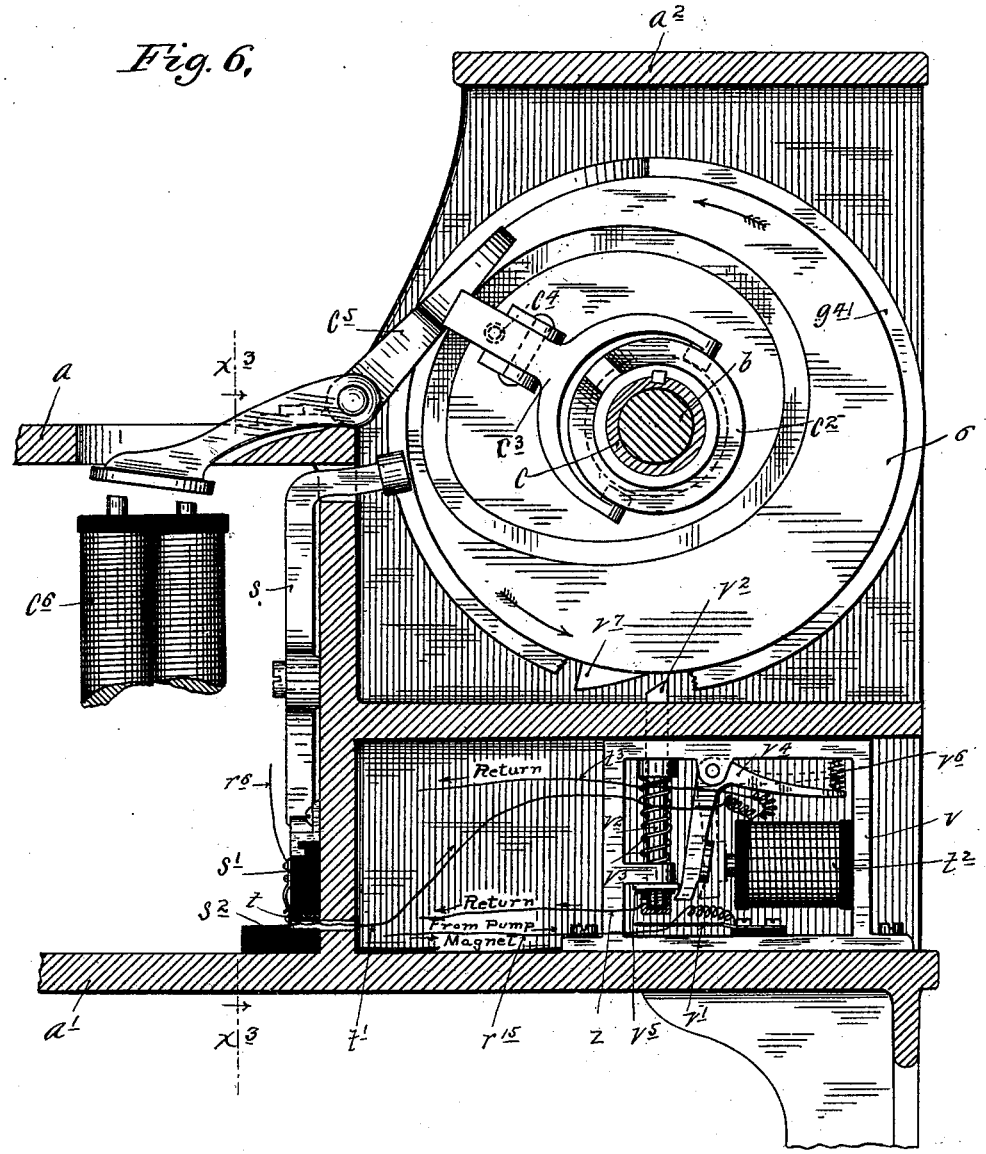

Figure 1 is a view in plan representing full size a specimen of the punctured representative strip or pattern which controls the actions of the type casting and setting machine. Fig. 2 is a diagram view representing the electric connections controlled by the strip. Fig. 3 is a view in vertical cross-section through the type casting and setting machine, approximately on the line $x^3$ $x^3$ of Figs. 5 and 6, with some parts removed and others broken away. Fig. 4 is a view, partly in plan and partly in horizontal section, with some portions removed and others broken away, for showing the relations of the clutch to the normally-idle cam-wheel and the constantly-running shaft of the machine. Fig. 5 is a vertical section lengthwise of the type casting and setting machine, approximately on the line $x^5$ $x^5$ of Fig. 3, with some parts broken away and others removed. Fig. 6 is a similar vertical section approximately on the line $x^6$ $x^6$ of Fig. 3, but looking in the opposite direction as compared with Fig. 5.

Respecting the frame, it is sufficient to note the main horizontal plates $a$ $a'$ and the top shelf $a^2$. The main shaft $b$, suitably journaled on the frame, receives motion from the combined pulley and fly-wheel $b'$ and carries a series of suitable cams for imparting the necessary positive motions to the other parts of the machine. These cams, as disclosed in my prior patent, were six in number and were marked with numerals from 1 to 6, inclusive; but only two of these—to wit, the constantly-running cam 1, keyed to the shaft $b$, and the normally-idle or intermittently-acting cam 6—are illustrated in the accompanying drawings. The cam 6 only acts between successive lines. As disclosed in my prior patent the cam 6 imparted positive motions to various parts connected with the delivery of the line of type last previously cast, the setting of the justifier for the next line, &c.; but under my present improvement the said cam-wheel 6 also performs certain additional functions in relation to the circuit-breaker or stop-action device, as will presently more fully appear. The said cam-wheel 6 is mounted on a loose sleeve $c$, which has splined thereto the shifting member $c^2$ of a clutch, the other member $c'$ of which clutch is formed on the hub of the constantly-running cam-wheel 1. The shifting clutch member $c^2$ is subject to the action of a shipper-lever $c^3$, pivoted to the profile face of the cam-wheel 6, and subject to the action of a spring $c^4$, tending to throw the clutch member $c^2$ into engagement with the clutch member $c'$ on the cam-wheel 1; but said sleeve is normally prevented from thus closing the clutch by a spring-held armature trip-lever $c^5$, pivoted to the bed-plate $a$ of the machine-frame and subject to a trip-magnet $c^6$. The sleeve $c$ extends through the body of the cam-wheel 6 and at its outer end carries a gear $c^7$, which engages with the larger member of a pair of gears $c^8$ $c^9$, mounted to turn together on a common stub-shaft $c^{11}$, suitably supported from the frame. The smaller gear $c^9$ engages with a gear $c^{10}$, formed on the hub of the cam-wheel 6. The gears $c^7$, $c^8$, and $c^{10}$ have the same number of teeth; but the gear $c^9$ has only half as many. Hence the effect of this differential gearing is to cause the cam-wheel 6 to turn once while the shaft $b$ turns twice. The cam-wheel 6 stands idle until the end of a line and is then tripped into action by the energizing of the clutch-trip magnet $c^6$ under the control of the representative strip. The cam-wheel 6 will then make one complete revolution while the shaft $b$ makes two, and will then be thrown out of gear automatically by the camming action between the upper arm of the trip-lever $c^5$ and the free end of the shipper-lever $c^3$, which are arranged to open the clutch. Said cam-wheel 6 operates a pivoted vertical lever $s$, which at its lower end takes hold of the upper or movable member $s'$ of the two-way switch. The lower or fixed member $s^2$ of said switch has double the number of contacts, as compared with the movable member $s'$ of the switch, for coöperation with said movable member $s'$ in two different positions thereof to establish what are distinguished as the so-called "working" and "setting" circuit connections. The switch-lever $s$ is operated by cam-surfaces $g^{41}$ on the cam-wheel 6, and the roller on said lever $s$ works through passes $g^{42}$, between the said surfaces $g^{41}$, as may be seen by reference to Fig. 3. Hence the said lever $s$ and the movable member $s'$ of the switch are positively held in each of said two opposite extreme positions. When the movable member $s'$ is in its rearmost position, as shown best in Figs. 2 and 3, the working-circuit connections are established over the wires shown in full lines in the diagram Fig. 2, and when the movable member $s'$ of the switch is in its forward or opposite extreme position the setting-circuit connections may be established over the wires shown in dotted lines in said diagram Fig. 2. Said movable member $s'$ of the two-way switch is held in said forward position to establish the setting-circuit connection for only a half-turn of the normally-idle cam-wheel 6 and is then restored to its normal position, as shown in Figs. 2 and 3, to establish the working-circuit connections or those maintained over the full-line wires during the time that the type for the given line are being cast and set. Referring to said diagram Fig. 2, the two sets of six wires each (marked $r^9$ and shown in dotted lines) extend from the fixed member $s^2$ of the switch to the magnets $p^{13}$, actuating the movable members of two corresponding sets of stops for positioning certain parts of the justifier relative to each other. The return-wires from the magnets $p^{13}$ join to a common wire $r^{16}$, returning directly to source. The four dotted-line wires $r^{10}$ extend from said fixed member $s^2$ of the switch to magnets $p^{19}$, actuating stops which intercept the lever $p^{15}$ for properly positioning the shifting member of the justifier-contacts to set the same as required relative to certain members thereof. The wires from the magnets $p^{19}$ unite to a common wire $r^{17}$, returning directly to source.

The nine full-line wires $r^7$ extend from the fixed member $s^2$ of the switch to corresponding magnets $h^{23}$, which actuate the movable members of the stops which position the matrix-block in its forward or row-selecting movements. The nine full-line wires $r^8$ extend from said switch member $s^2$ to magnets $h^{26}$, which actuate the movable members of the stops which position the matrix-block in its movement toward the left for selecting the particular or individual matrix in the row. The return-wires from the row-selecting stops $h^{23}$ are grouped according to the number of different sizes of matrices represented in running width of face for character-type, and four thereof, $r^{11}$, extend to corresponding members of the magnets $g^{21}$, which actuate the movable members of a set of stops for properly positioning the mold-plunger to produce type of the desired different sizes of face. The said mold-magnets $g^{21}$ are marked with numerals representing the different sizes of face which they control. The other or fifth return-wire $r^{12}$ from the magnets $h^{23}$ extends directly to the common return-wire $r^{14}$ from the mold-magnets $g^{21}$. This is done because the extreme position of the mold-plunger—to wit, that for producing six-unit type—is determined by a fixed stop requiring no magnet. Likewise the extreme positions of the matrix-block are determined by fixed stops requiring no magnets, and this position is taken by the matrix-block at word-spaces for casting quads.

When a word-space hole is reached on the strip, the connection to the mold-magnets $g^{21}$ is made directly from the proper member of the thrust-pins $r^4$ over the escapement branch of the working circuit and the set members of the justifier, which branch of the working circuit includes the full-line wire $r^{18}$, the justifier-escapement magnet $p^{25}$, the wire $r^{19}$, the justifier-contacts $p$ to $p^5$, the proper members of the branch lead-contacts 1 to 6 on the branch lead-board $p^7$, and the proper members of the six wires $r^{20}$, five of which lead to corresponding mold-magnets $g^{21}$ and the other or sixth member thereof leads directly to the return-wire $r^{14}$ from the mold-magnet.

From the foregoing it will be seen that all the magnets in the working circuit have return-wires which unite to the common return-wire $r^{14}$, which leads to the pump-trip magnet $f^{22}$.

From the pump-trip magnet $f^{22}$ a wire $r^{15}$ led directly back to source, as shown in my prior patent, but as arranged for the present invention now leads to a fixed contact on the circuit-breaker, whence another wire $z$ leads back to source. The details of this circuit-breaker will now be given.

On a suitable frame $v$, shown as fixed to the main machine-frame directly below the cam-wheel 6, is mounted an insulated spring-contact $v'$, to which the return-wire $r^{15}$ from the pump-magnet is attached. This contact $v'$ normally engages with the lower end of a spring-seated plunger-contact $v^2$, which has attached thereto the final return-wire $z$, which leads back to source. The said plunger-contact $v^2$ is mounted in suitable guides, and its spring $v^3$ tends to throw the same into an uppermost position or away from the spring-contact $v'$. It is normally prevented from this upward movement by an armature-lever $v^4$ of bell-crank form, the lower end of which normally overreaches a collar $v^5$ on the plunger-contact $v^2$ and holds the same in its lowermost or normal position against the face of the spring-contact $v'$. The armature trip-lever $v^4$ is subject to a spring $v^6$, tending to make the same assume the position shown in Fig. 5. Said armature trip-lever $v^4$ is, however, subject to the action of a magnet $t^2$, which is connected by a wire $t'$ to a contact $t$ on the fixed member $s^2$ of the two-way switch, and from the said magnet $t^2$ a wire $t^3$ leads back to source. This magnet $t^2$ is therefore in a branch of the so-called "setting-circuit," and when said magnet $t^2$ is energized the armature-lever $v^4$ will be pulled away from the collar $v^5$ on the spring-seated plunger-magnet $v^2$, thereby permitting the parts to assume the position shown in Fig. 6. Whenever this occurs, the working circuit will of course be open between the contacts $v'$ and $v^2$. When said plunger-contact $v^2$ is in its uppermost position, as shown in Fig. 6, it stands directly below the cam-wheel 6 and will so remain until the cam-wheel 6 is started into action for the next line. Hence the circuit will remain open until that event occurs. When the cam-wheel 6 is again started into action, a cam-lug $v^7$, carried on the periphery thereof, will strike the upper end of the plunger-contact $v^2$ and force the same downward to its lowermost position, thereby permitting the armature-lever $v^4$ under the tension from the spring $v^6$ to reëngage the collar $v^5$ and hold the parts in the position shown in Fig. 5. The presence of the two-way switch $s'$ $s^2$ permits the thrust-pins $r^4$, or most thereof, to serve a double purpose—to wit, to coöperate with the working holes in the strip to control the circuit connections over the so-called "working-circuit" branches when the switchboard is in the position shown in the diagram Fig. 2 and to coöperate with the setting-circuit connections when the movable member of said switch is in its opposite extreme position; but for setting the parts of the justifier only sixteen of said thrust-pins $r^4$ are needed. The bank of thrust-pins $r^4$ are twenty in number. Two, however, coöperate with connections which do not pass through the two-way switch—to wit, the escapement-circuit member working at word-spaces, as hitherto noted, via wire $r^{18}$, &c., and the trip-clutch member coöperating with the wires $r^{21}$ and $r^{22}$ for energizing the trip-clutch magnet $c^6$. This left two members of said thrust-pins $r^4$ idle when the movable member of the switch was in setting position as the parts were related in my prior patent. Hence I have appropriated one of these otherwise-idle thrust-pins $r^4$ for coöperation with the connections $t$ $t'$ $t^2$ $t^3$ to energize the circuit-breaker-trip magnet $t^2$ under the control of the stop-action hole on the strip. The particular thrust-pin $r^4$ appropriated to this purpose is represented in black on the diagram Fig. 2 and where the same appears in Fig. 5.

Referring now to the specimen strip illustrated in Fig. 1, the composition is a continuation of the composition represented on the strip shown in Fig. 22 of my prior patent, No. 609,098. In the continuation the operator at the composing-machine is assumed to have made an error in the spelling of the word "value." The last word of the old line was "must." The first words of the next line incorrectly read "be of valeu." Having detected the error, the operator then struck the special key provided for making the stop-action hole, which is so marked on the strip, and then followed with the clutch-trip key in the customary way for ending a line of composition. Then he proceeded with the corrected line just the same as if nothing had happened. By reference to the strip it will be seen that the corrected line reads "be of value in a machine of this charac-." The sentence is completed by the syllable "ter" appearing in the next line on the strip. Now when this strip $n$ comes into use on the type casting and setting machine it will be unwound from the spool $n^2$ and, passing through suitable guides on the pedestal $n^{13}$, will become subject to the bank of thrust-pins $r^4$, which are carried by the carriage $n^{28}$, which receives vertical motion at the proper times from the plunger $n^{17}$, all as fully disclosed in my prior patents. The thrust-pins $r^4$ are provided with overhanging projections at their upper ends, which dip constantly into mercury-wells $r^3$, as shown in Fig. 5, which for the purpose of this case may be assumed to be constantly charged with a current. As a matter of fact, on the working machine the current from source can only reach the bed of the machine and thereover said mercury-wells $r^3$ during a certain portion of each revolution of the constantly-running shaft $b$, as fully disclosed in my prior patent, No. 609,098, as may be readily seen by reference to the diagram view in Fig. 37 of said prior patent. Assuming the current to be available to the mercury-cells $r^3$, it is of course obvious that such of the pins as register with holes in the strip may pass therethrough into the mercury-cells in the bed, and thereby establish circuit connections over the sectional wires $r^6$ to the contacts on the movable member $s'$ of the two-way switch and therefrom over the working or setting circuit connections, according to the position of the movable member relative to the fixed member of the switch. Likewise at word-spaces the proper thrust-pin closes the escapement member of the working-circuit connections, and the proper thrust-pin can close the trip-clutch circuit over the wires $r^{21}$ $r^{22}$ under the control of the trip-hole on the strip. Hence when the strip $n$, containing the faulty line or part of a line, as shown in Fig. 1, is brought into action on the type casting and setting machine the controlling action will be exactly the same as in my prior patent until the faulty line is reached on the strip. Then the clutch-trip circuit will be closed in the usual way under the control of the trip-hole, thereby starting the normally-idle cam-wheel 6 into action. This of course shifts the movable member $s'$ of the two-way switch in the usual manner. Then the stop-action hole on the strip will come next into action, thereby closing the circuit over the wires $t'$ $t^3$ through the trip-magnet $t^2$ of the circuit-breaker and throwing the latter into its open position, where it will remain set until the cam-wheel is again started into action, or, in other words, until after the next correct line has been reached on the strip. Hence during that portion of the strip's travel which contains the faulty line or part of a line the working circuit will be held open and no casting action will take place. As quick as the trip-hole is reached for the next correct line the cam-wheel 6 will be again started into action, and at the very initial part of its motion the cam-lug $v^7$ will force the plunger-contact $v^2$ into its lowermost position, where it will be caught by the armature-lever $v^4$ and be held in its normal position, as shown in Fig. 5 of the drawings. The working circuit is therefore again closed at the circuit-breaker and all the parts are in position as customary for the proper action of the justification-holes at the next feed-space of the strip, and after they have done their work the movable member of the switch is restored to its normal position, the cam-wheel 6 is tripped out of action, and the casting proceeds under the control of the working holes on the strip in the customary way.

It will be understood, of course, that the invention herein disclosed may be embodied in various forms of construction without departing from the spirit of my invention.

What I claim, and desire to secure by Letters Patent of the United States, is as follows:

1. A representative pattern or dummy, for controlling the actions of an automatic machine, such as a type casting or setting machine, which pattern when containing typographical errors, or other undesired matter in its representation, also contains the representation of a stop-action, for preventing the automatic machine from reproducing in its product the undesired matter represented on the strip, substantially as described.

2. In an automatic machine, controlled by a representative pattern or dummy to produce a desired product represented on the pattern, such as a set line of type, a stop-action device also controlled by said pattern, for rendering the machine inoperative to produce any product containing typographical error or other undesired matter, represented on said pattern, substantially as described.

3. In an automatic type casting or setting machine, controlled by a pattern or dummy representing the desired composition, and it may be also some typographical error, or other undesired matter, a stop-action device also controlled by said strip, for rendering the type casting or setting machine inoperative to cast or set type corresponding to the erroneous or undesired matter represented on the strip, substantially as described.

4. In a type casting and setting machine, wherein the type-casting actions are directly controlled by electric devices and the circuit connections for said electric devices are controlled by a representative pattern or dummy, the combination with said circuit connections of a circuit-breaker under the control of said pattern or dummy, for opening the circuit through the electric devices controlling the casting action throughout the time that said pattern is making its necessary feed movements or travel, to pass the undesired matter represented thereon, substantially as described.

5. In a type casting and setting machine, wherein the casting actions are directly controlled by electric devices, including a pump-trip magnet, the combination with the punctured representative strip, of circuit connections for said electric devices controlled by said strip, including the bank of thrust-pins, the two-way switch, the setting branches, the working-circuit branches having a common return-wire through said pump-trip magnet, the clutch-trip and its special circuit connections, a circuit-breaker in said common return branch of the working circuit, and an electric trip for said circuit-breaker in one branch of the setting-circuit and subject to the control of a stop-action hole on said strip, substantially as and for the purposes set forth.

In testimony whereof I affix my signature in presence of two witnesses.

GEORGE A. GOODSON.

Witnesses:
CHARLES L. SPIER,
GEORGE W. WATTSON.